United States Patent
Cashman et al.

(10) Patent No.: US 10,867,441 B2
(45) Date of Patent: Dec. 15, 2020

(54) METHOD AND APPARATUS FOR PREFETCHING DATA ITEMS TO A CACHE

(71) Applicant: Microsoft Technology Licensing, LLC, Redmond, WA (US)

(72) Inventors: Thomas Joseph Cashman, Cambridge (GB); Andrew William Fitzgibbon, Cambridge (GB); Erroll William Wood, Cambridge (GB); Federica Bogo, Kilchberg (CH); Paul Malcolm McIlroy, Cambridge (GB); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/278,018

(22) Filed: Feb. 15, 2019

(65) Prior Publication Data

US 2020/0265641 A1 Aug. 20, 2020

(51) Int. Cl.
*G06T 19/00* (2011.01)
*G06T 17/20* (2006.01)
(Continued)

(52) U.S. Cl.
CPC ............ *G06T 17/205* (2013.01); *G06T 7/536* (2017.01); *G06T 7/75* (2017.01); *G06T 19/006* (2013.01)

(58) Field of Classification Search
CPC ....................................... G06F 3/017
See application file for complete search history.

(56) References Cited

U.S. PATENT DOCUMENTS 9,940,727 B2 * 4/2018 Medioni ............... G06T 7/0075
10,127,723 B2 * 11/2018 Miller .................... G06F 3/013
(Continued)

FOREIGN PATENT DOCUMENTS

WO 2018033852 A1 2/2018

OTHER PUBLICATIONS

Dornaika et al., "Pose Estimation using Point and Line Correspondences", 1999, Real-Time Imaging 5, pp. 215-230 (Year: 1999).*
(Continued)

*Primary Examiner* — Phong X Nguyen

(57) ABSTRACT

An apparatus for detecting pose of an object is described. The apparatus has a processor configured to receive captured sensor data depicting the object. The apparatus has a memory storing a model of a class of object of which the depicted object is a member, the model comprising a plurality of parameters specifying the pose, comprising global position and global orientation, of the model. The processor is configured to compute values of the parameters of the model by calculating an optimization to fit the model to the captured sensor data, wherein the optimization comprises iterated computation of updates to the values of the parameters and updates to values of variables representing correspondences between the captured sensor data and the model, the updates being interdependent in computation. The processor is configured to discard updates to values of the variables representing correspondences without applying the updates.

20 Claims, 6 Drawing Sheets

(51) Int. Cl.
*G06T 7/73* (2017.01)
*G06T 7/536* (2017.01)

(56) References Cited

U.S. PATENT DOCUMENTS

| | | | | |
|---|---|---|---|---|
| 2011/0154249 | A1* | 6/2011 | Jang | H04M 1/0272 715/781 |
| 2012/0056901 | A1* | 3/2012 | Sankarasubramaniam | G06F 3/017 345/660 |
| 2013/0162520 | A1* | 6/2013 | Kettle | G06F 3/04883 345/156 |
| 2013/0278504 | A1* | 10/2013 | Tong | G06K 9/00355 345/158 |
| 2015/0073262 | A1* | 3/2015 | Roth | H04R 25/658 600/411 |
| 2015/0097812 | A1* | 4/2015 | Huang | G06F 3/0425 345/175 |
| 2015/0235367 | A1* | 8/2015 | Langer | G06T 5/00 348/135 |
| 2015/0261299 | A1* | 9/2015 | Wajs | G06K 9/2018 726/19 |
| 2015/0316996 | A1* | 11/2015 | Dal Mutto | G06F 3/0481 345/156 |
| 2016/0253842 | A1* | 9/2016 | Shapira | G06F 3/017 345/633 |
| 2016/0335790 | A1* | 11/2016 | Fleishman | G06K 9/00355 |
| 2017/0185141 | A1* | 6/2017 | Shotton | G06F 3/04815 |
| 2017/0186165 | A1* | 6/2017 | Taylor | G06T 17/205 |
| 2018/0033189 | A1* | 2/2018 | Ma | G06T 13/40 |
| 2018/0182166 | A1 | 6/2018 | Shen et al. | |
| 2018/0314920 | A1* | 11/2018 | Cai | G06F 17/18 |
| 2019/0180473 | A1* | 6/2019 | Guleryuz | G06T 5/002 |

OTHER PUBLICATIONS

"International Search Report and Written Opinion issued in PCT Application No. PCT/US20/014687", dated Apr. 1, 2020, 11 Pages.

* cited by examiner

METHOD AND APPARATUS FOR PREFETCHING DATA ITEMS TO A CACHE

BACKGROUND

Detecting the pose of a 3D object, such as a human body, human hand, a laptop computer, a coffee mug, a robot, an animal or other object, is challenging to achieve with high levels of accuracy and speed from captured sensor data such as video images or depth camera images or other sensor data. The pose comprises a global position and global orientation of the object and optionally the positions and orientations of one or more joints of the entity where the entity is articulated. Where pose is to be detected using a resource constrained device such as a smart phone, smart watch or augmented reality headset, it is particularly difficult to achieve accuracy and/or robustness. Once the pose has been detected it is extremely useful for downstream applications such as human computer interaction, intelligent sensing and control and other applications. For many of these applications pose is to be detected in real time in order for the technology to work in a practical manner.

The embodiments described below are not limited to implementations which solve any or all of the disadvantages of known apparatus for detecting pose of 3D objects.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An apparatus for detecting pose of an object is described. The apparatus has a processor configured to receive captured sensor data depicting the object. The apparatus has a memory storing a model of a class of object of which the depicted object is a member, the model comprising a plurality of parameters specifying the pose, comprising global position and global orientation, of the model. The processor is configured to compute values of the parameters of the model by calculating an optimization to fit the model to the captured sensor data, wherein the optimization comprises iterated computation of updates to the values of the parameters and updates to values of variables representing correspondences between the captured sensor data and the model, the updates being interdependent in computation. The processor is configured to discard updates to values of the variables representing correspondences without applying the updates.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

A depth image is a two dimensional (2D) array where each entry comprises a distance value which is a distance from the camera to a surface in the scene depicted in the depth image. A point cloud is an array where each entry comprises a three dimensional (3D) coordinate of a surface point in the scene depicted in the image. A depth image is back-projected to compute a 3D point cloud using knowledge of the camera. In some examples a 3D point cloud is captured by a scanning sensor rather than by back projecting from a depth image.

The pose of an object comprises the global position and global orientation of the object and optionally the positions and orientations of one or more joints of the entity where the entity is articulated. The pose therefore has at least six degrees of freedom given by the global position and global orientation and has more than six degrees of freedom where positions and orientations of one or more joints are also included.

Figure 1:
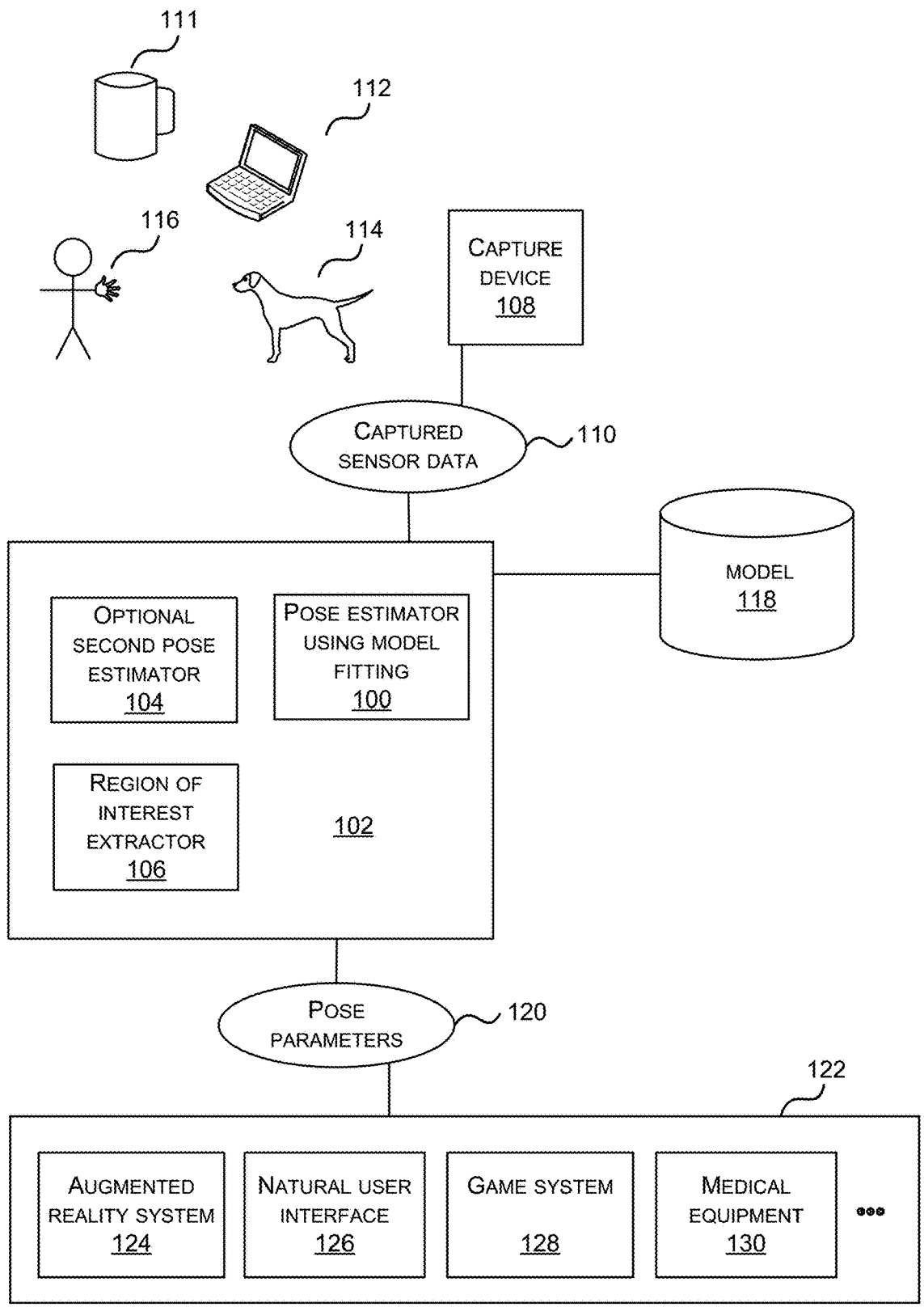
FIG. 1 is a schematic diagram of an apparatus for detecting pose of a 3D object.

FIG. 1 is a schematic diagram of an apparatus 102 which detects values of pose parameters of a 3D object by computing values of the pose parameters from captured sensor data. The pose parameters comprise a global location and global orientation of the object an optionally positions of one or more joints of the object. The global location and global orientation comprise six degrees of freedom so that there are at least 6 parameters whose values are to be computed.

A capture device 108 such as a color camera, depth camera, a sensor which captures three dimensional (3D) point clouds, or other type of sensor captures data depicting the object in an environment. In the example of FIG. 1 the object is shown as a coffee mug 111, a human hand 116, a laptop computer 112, or a dog 114 but any other object may be used. The object is articulated in some examples, and in other examples it is not articulated. The captured data 110 such as an image or 3D point cloud is input to the apparatus 102 using a wired or wireless link, over a communications network or in other ways.

The apparatus 102 is computer implemented for example in a mobile phone, in a personal computer, in a head worn augmented reality computing device, in a game system, in medical equipment or in other apparatus depending on the application domain concerned. The apparatus 102 has access, over a wired or wireless communications link over a network, or from a memory at the apparatus itself, to a store holding a model 118 of the object. For example, the model 118 is stored at the mobile phone, medical equipment, game system or other device. The model 118 is stored at a remote location accessible to the apparatus 102 over a communications network, in some examples. The apparatus has an input such as a wireless receiver, a wired communications port or other input to a computing device, which receives captured sensor data from the capture device 108. The capture device 108 sends the captured sensor data to the apparatus 102 over a network in some examples. The apparatus receives captured sensor data from more than one capture device in some examples. The sensor data 110 received at the apparatus is stored in a memory of the apparatus such as the memory described later in this document.

The model 118 is a model of a class of 3D objects such as human hands, human bodies, or coffee mugs. The apparatus is configured to detect pose of objects in the class of 3D objects of the model.

The apparatus computes values of pose parameters 120 of the model 118 which fit the captured data 110. The apparatus is able to do this for a single instance of the captured data 110. In some examples the apparatus computes a stream of values of the pose parameters 120 as a stream of captured data 110 is input to the apparatus 102. In this way the apparatus 102 follows pose of the articulated object as it moves and/or as the capture device 108 moves. The computed values of the pose parameters 120 are input to one or more downstream apparatus 122 such as an augmented reality system 124, a natural user interface 126, a game system 128, medical equipment 130 or others. In the case of an augmented reality system or a robotic system, the computed values of the pose parameters are used to enable an apparatus to interact with the object. In the case of a natural user interface the computed values of the parameters are used to enable the object to interact with a computing device, such where the object is a human body or human hand which is used to make gestures and control a computer.

The apparatus itself comprises a pose estimator which uses model fitting 100, an optional second pose estimator 104 using another type of technology, and optionally a region of interest extractor 106.

The example of FIG. 1 is extended in some examples, by detecting values of other parameters of the 3D object, such as shape parameters of the 3D object, in addition to values of pose parameters.

In some examples, the functionality of the apparatus 102 is performed, at least in part, by one or more hardware logic components. For example, and without limitation, illustrative types of hardware logic components that are used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
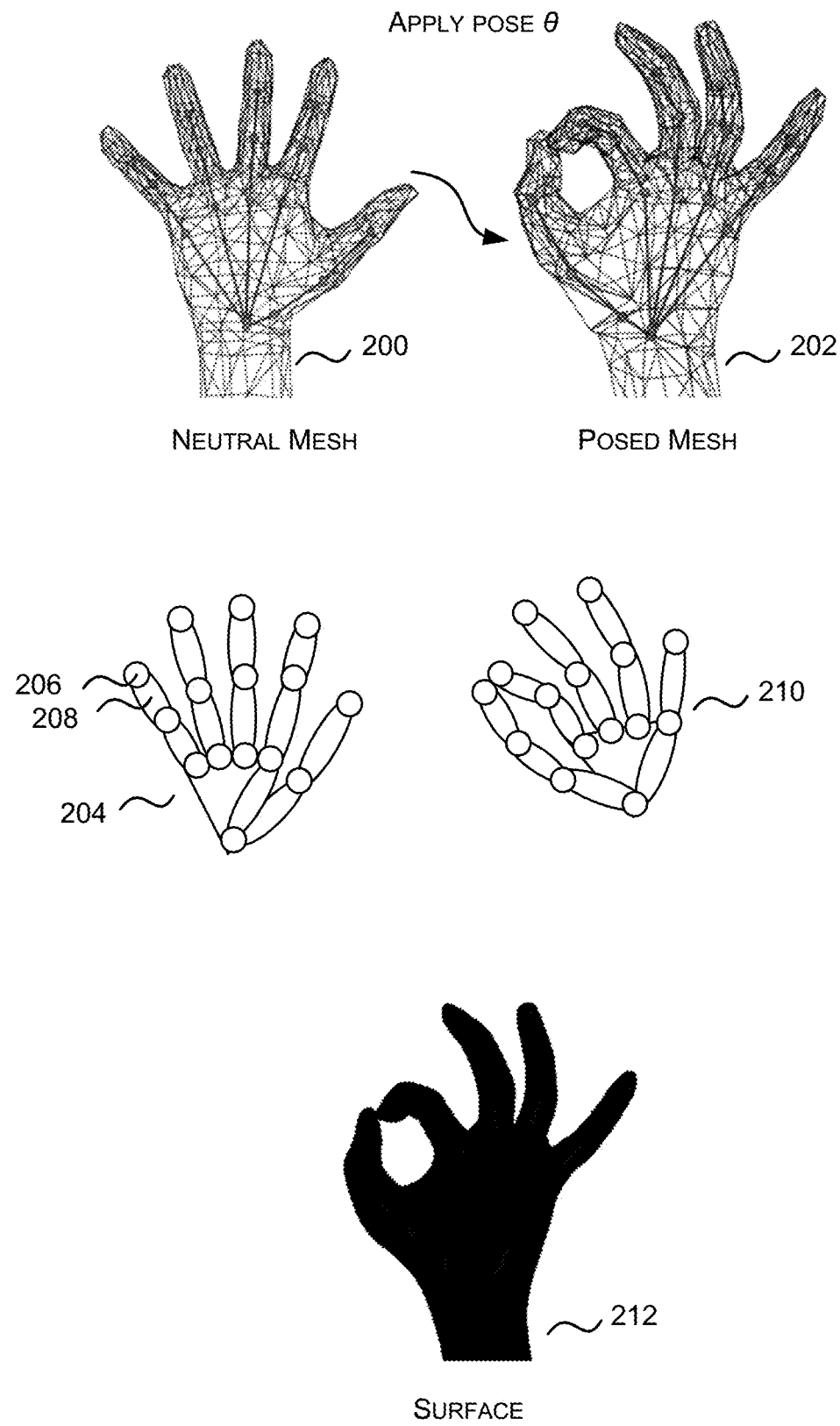
FIG. 2 is a schematic diagram of a neutral triangle mesh model of a human hand, a posed triangle mesh of a human hand, a neutral sphere mesh model of a human hand, a posed sphere mesh model of a human hand, and a posed smooth surface model of a human hand.

FIG. 2 is a schematic diagram of a neutral triangle mesh model 200 of a human hand, a posed triangle mesh model 202 of a human hand, a neutral sphere mesh model 204 of a hand, a posed sphere mesh model 210 of a hand and a smooth surface model 204 of a posed human hand.

In the example of FIG. 2 a neutral polygon mesh model of a human hand is a triangular mesh 200 which is rigged as it contains a representation of a skeleton. When values of pose parameters, such as global position, global orientation and joint positions, of the skeleton are applied to the neutral mesh model 200 a posed mesh model such as 202 is obtained. A polygon mesh model comprises a plurality of polygons arranged to tessellate in order to represent the surface of an object. The surface of a polygon mesh model has discontinuities where the polygons meet.

A smooth surface may be computed from a polygon mesh model, such as the posed triangle mesh model 202 to obtain smooth surface 212. A smooth surface may be computed by repeatedly subdividing the faces of a polygon mesh model until in the limit, a smooth surface is obtained, referred to as the limit surface corresponding to the polygon mesh. Other ways of computing a smooth surface are available. For example, closed-form solutions may be used to evaluate a point on the limit surface or a closely related approximation so that in practice it is not essential to subdivide the faces of the mesh model infinitely. However, computing a smooth sub-division surface from a polygon mesh is computationally expensive. The present technology enables pose tracking without the need to compute smooth sub-division surfaces so that efficiencies are gained.

FIG. 2 shows a neutral sphere mesh model 204 of a human hand. A sphere mesh model is formed from a plurality of spheres 206 linked together by capsules 208 where a capsule is a container that is wrapped around two or more spheres and where the spheres press outwards against the sides of the container. In the example in FIG. 2 the sphere mesh of a hand uses three spheres per digit. A sphere mesh is an example of a model of a 3D object where the model is a non-manifold model, and more specifically is not a single 2-manifold. A non-manifold model is a representation of a 3D object comprising surfaces with discontinuities. A manifold model is a representation of a 3D object comprising a continuous surface.

For models which are not a single 2-manifold and which are not assumed to be a single 2-manifold, model fitting is typically carried out using iterated closest point (ICP). ICP is a workable approach however, it is time consuming since it typically takes many iterations to find a solution. The embodiments described herein achieve model fitting without the need for ICP; that is an optimization process is used which is not the well-known iterated closest point algorithm.

In the present technology, a so called "lifted" optimization is used which converges faster than alternatives such as ICP. A lifted optimization is one where both the values of parameters of the 3D model and values of correspondence variables are varied as part of the optimization. In a lifted optimization, variables representing correspondences between the data and the model are included in the optimization jointly with the pose parameters. Each correspondence variable is an indication of a 3D point on the surface of the model corresponding to a captured data point.

It is recognized herein that it has not previously been possible to carry out model fitting using a lifted optimization and where the 3D model is not a single 2-manifold (for example, where the 3D model is a sphere mesh) or is not assumed to be a single 2-manifold. As a result, ICP is typically used to fit sphere mesh models to sensor data in order to compute pose, even though ICP is time consuming. There exists a prejudice against using sphere mesh models for model fitting with lifted optimization. Previously model fitting with lifted optimization was only applicable to manifold surfaces and the present technology teaches how to apply lifted optimization to non-manifold models as well as manifold surface models.

The apparatus 102 operates in an unconventional manner to achieve accurate, real time pose detection of 3D objects even where a model used as part of the pose detection is not a single 2-manifold. At least part of the unconventional manner involves discarding updates to correspondences before they are used as described in more detail below.

The processor improves the functioning of the underlying computing device by enabling pose to be computed using a lifted optimization even where a sphere mesh model of the object is used, or any other model which is not a single 2-manifold or not assumed to be a single 2-manifold. In various of the embodiments described herein the model is a manifold surface locally, in a region near each correspondence, in order to compute derivatives with respect to the correspondences.

Figure 3:
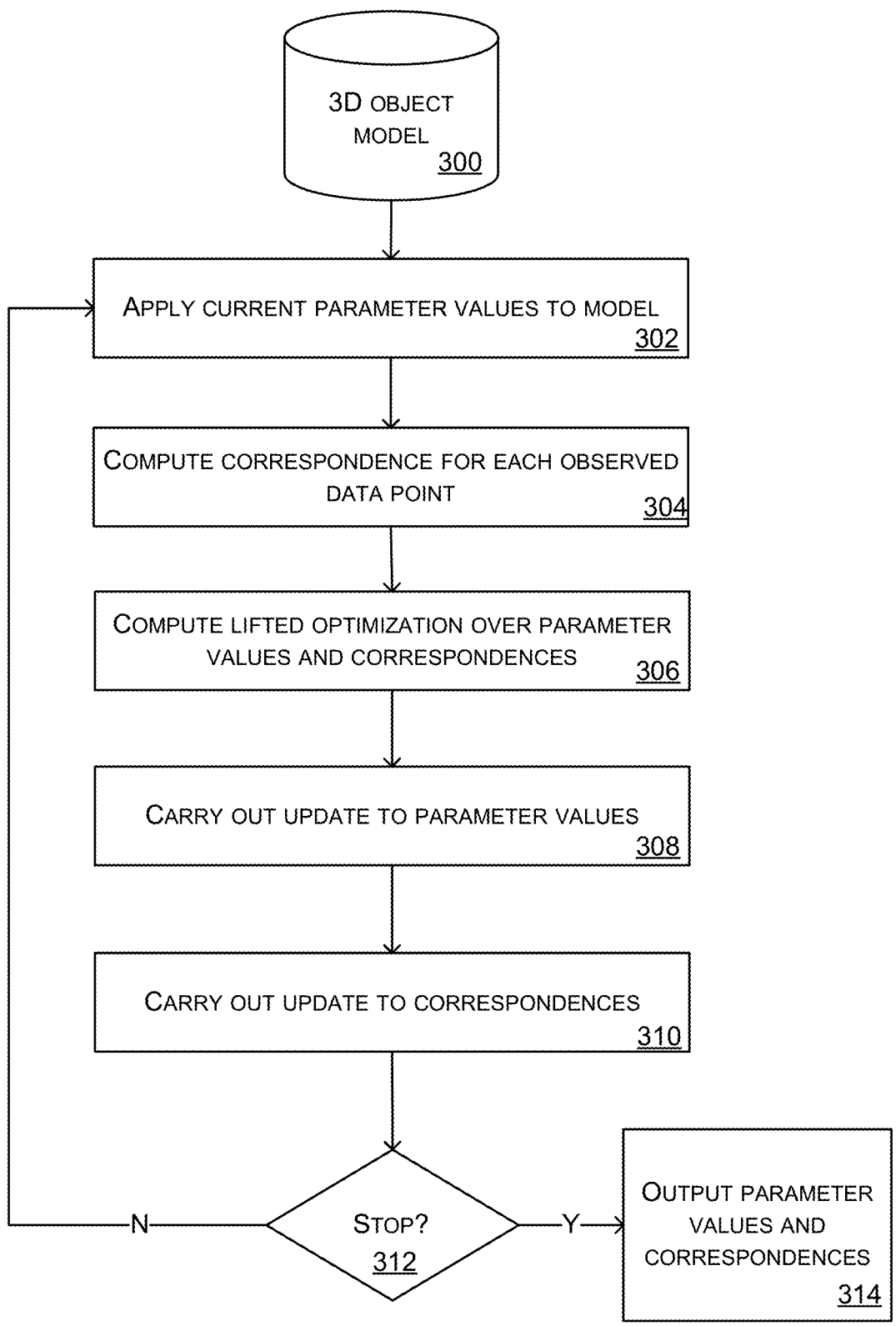
FIG. 3 is a flow diagram of an example method of operation at the apparatus of FIG. 1 in which a correspondence update is computed and applied.

FIG. 3 is a background example which is given to aid understanding of the present technology. It describes use of lifted optimization for model fitting where the model is a polygon mesh model or a smooth surface model.

FIG. 3 is a flow diagram of an example method of operation at the apparatus of FIG. 1. The apparatus accesses a rigged polygon mesh model 300 of the object. For example, in the case that the aim is to track a coffee mug the apparatus accesses a rigged polygon mesh model of a generic coffee mug.

The apparatus receives captured data depicting the object to be tracked. For example, the captured data is a 3D point cloud, a depth map, one or more frames of raw time of flight data, color image data or other captured data depicting the object to be tracked. Optionally a region of interest is extracted from the captured data where the region of interest depicts the object to be tracked rather than other parts of the scene or environment in which the object is present. For example, the apparatus uses machine learning technology or image analysis to extract a region of interest of the captured data depicting the object to be tracked. The region of interest may or may not be contiguous.

In some examples, where the region of interest comprises parts of a depth map, the apparatus computes a 3D point cloud by back projecting the region of interest. In some cases a 3D point cloud is already available. In some cases no 3D point cloud is used.

The apparatus applies 302 current values of the model parameters to the model 300. The current values of the model parameters are the values computed for a previous instance of the captured data 110. If there are no previous instances of captured data 110 then the values are initialized to random values or are manually set or are estimated using machine learning techniques.

The apparatus computes 304 a correspondence for each of a plurality of the observed data points in the captured data. In this example, a correspondence is a tuple of values denoted by the symbol u, which specifies a point on a surface referred to herein as a Phong surface, which is an approximation to a smooth surface derived from the rigged polygon mesh but without the need for computing a limit surface. A defining function S is stored at the apparatus and is a function which takes as its input a correspondence u and the pose parameters θ. The defining function S computes a 3D position in the world that point u on the Phong surface corresponds to. In an example, polygon indices of the polygon mesh are stored on disk, and the defining function S which is implemented in code, is also stored on disk. The defining function S uses the polygon indices alongside the mesh posing implementation to evaluate the surface by interpolating between the vertices given by the polygon indices. In this way the defining function S is used, together with knowledge of a capture device used to capture the sensor data, to compute the correspondences. Where initial values of the correspondences are already known (from operation 310 which is described later) the initial values are used to influence or simplify the computation of the correspondences at operation 304.

Once the correspondences have been computed the apparatus computes a lifted optimization 306 jointly over the parameter values of the model the correspondences. In an example the lifted optimization computes minimization of the following objective function:

$$\min_{\theta, u_1, \ldots, u_n} \sum_{i=1}^{n} \psi(\|x_i - S(u_i; \theta)\|) + \psi^\perp(\|x_i^\perp - S^\perp(u_i; \theta)\|)$$

Which is expressed in words as a minimum over the pose parameters θ and n values of the correspondences u of the sum of a robust kernel ψ(.) applied to the magnitude of the difference between a 3D point cloud point $x_i$ and a corresponding 3D surface point $S(u_i; \theta)$, and a different robust kernel $\psi^\perp(.)$ applied to the magnitude of the difference between a 3D point cloud normal $x_i^\perp$ and a corresponding 3D surface normal $S^\perp(u_i; \theta)$. The 3D surface point in this equation lies on a rigged polygon mesh, while the 3D surface normal is an approximation to the geometric normal of a smooth surface such as a subdivision surface. The surface, referred to herein as a Phong surface, is not computed in its entirety; rather particular parts of the Phong surface are computed as and when needed. The corresponding 3D surface points given by $S(u_i; \theta)$, and the corresponding 3D surface normals $S^\perp(u_i; \theta)$ are efficient to compute in the approximate (Phong) surface case. The 3D Phong surface normal is computed by computing approximate surface normals along it. The robust kernels ψ(.) and $\psi^\perp(.)$ are a Geman-McClure kernel, a Huber kernel, a Quadratic kernel or other kernel. In examples where other parameters of the 3D object are detected (such as shape parameters), these parameters may be included in the objective function such as the objective function above.

The result of the lifted optimization 306 comprises updates to be added to the parameter values of the model, and updates to be applied to the correspondences.

The apparatus carries out 308 the update to the parameter values of the model by adding the update computed by the lifted optimization to the current values of the model parameters.

The apparatus carries out 310 the update to the correspondences by walking the correspondences along the Phong surface by an amount and in a direction specified by the lifted optimization results.

The apparatus checks whether the process of FIG. 3 is to stop or to continue by returning to operation 302. If convergence has been reached, since the amount of the updates at operations 308 and 310 was below a threshold, then the process stops. If a specified number of iterations of the process of FIG. 3 have been carried out then the process stops. When the process stops it outputs 314 the parameter values of the model and the values of the correspondences.

The inventors have recognized that by discarding the updates to the correspondences, and thus omitting operation 310, it is possible to achieve lifted optimization even where the model 300 is not a single 2-manifold (such as where the model 300 is a sphere mesh). The benefits are significant since the model 300 is greatly simplified as compared with a polygon mesh or a smooth surface model. Using a simple model gives efficiency gains for downstream processes such as apparatus 122. Using a simple model also facilitates computation of the correspondences at operation 304. An example in which updates to the correspondences are discarded is now described with reference to FIG. 4.

Figure 4:
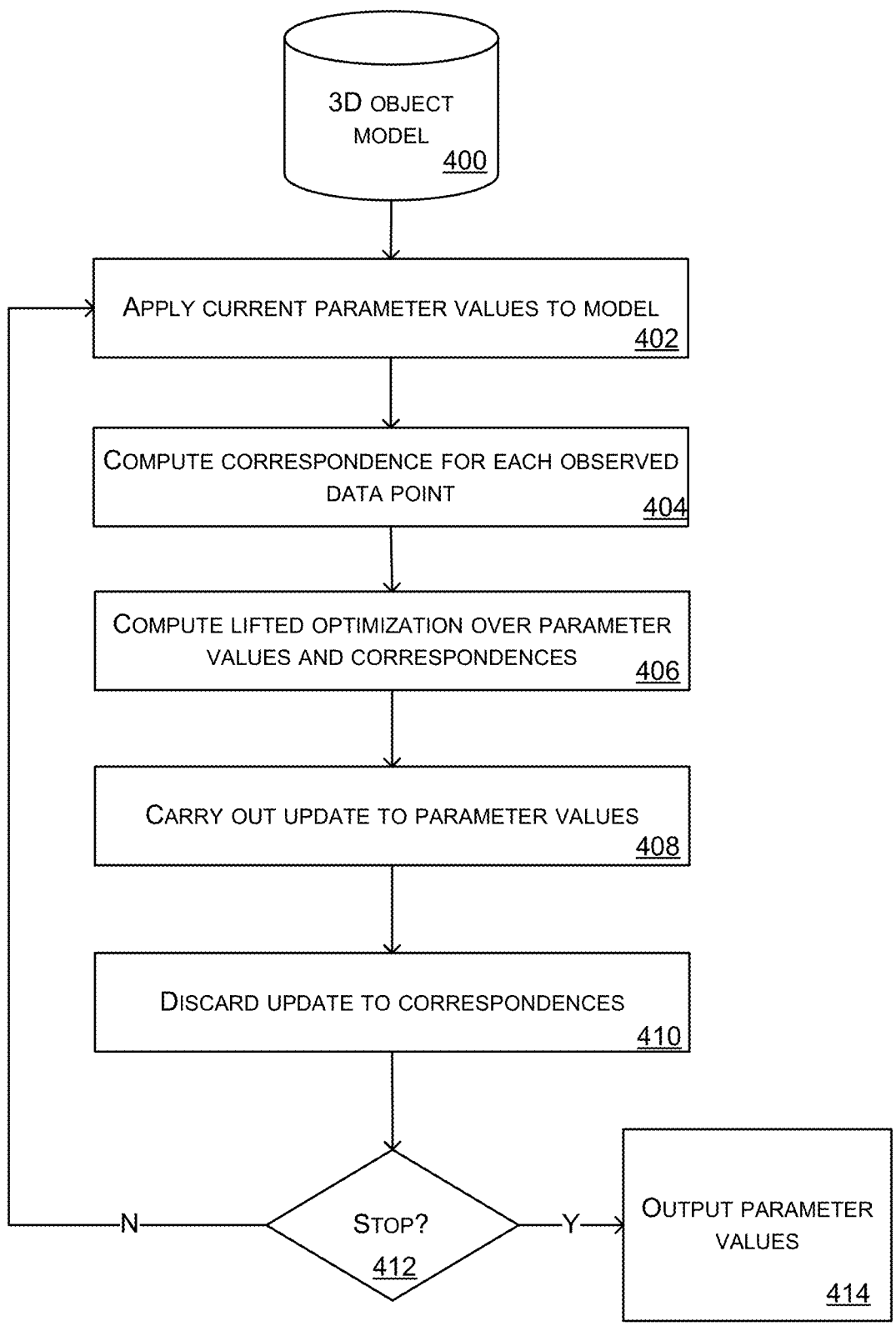
FIG. 4 is a flow diagram of an example method of operation at the apparatus of FIG. 1 where a correspondence update is computed and discarded without being applied.

FIG. 4 is a flow diagram of an example method of operation at the apparatus of FIG. 1. The apparatus accesses a sphere mesh model 400 of the object. For example, in the case that the aim is to track a human hand the apparatus accesses a neutral sphere mesh model of a generic human hand such as that shown in FIG. 2.

The apparatus receives captured data depicting the object to be tracked. For example, the captured data is a 3D point cloud, a depth map, one or more frames of raw time of flight data, color image data or other captured data depicting the object to be tracked. Optionally a region of interest is extracted from the captured data where the region of interest depicts the object to be tracked rather than other parts of the scene or environment in which the object is present. For example, the apparatus uses machine learning technology or image analysis to extract a region of interest of the captured data depicting the object to be tracked. The region of interest may or may not be contiguous.

In some examples, where the region of interest comprises parts of a depth map, the apparatus computes a 3D point cloud by back projecting the region of interest. In some cases a 3D point cloud is already available. In some cases no 3D point cloud is used.

The apparatus applies 402 current values of the model parameters to the model 400. The current values of the model parameters are the values computed for a previous instance of the captured data 110. If there are no previous instances of captured data 110 then the values are initialized to random values or are manually set.

The apparatus computes 404 a correspondence for each of a plurality of the observed data points in the captured data. In this example, no Phong surface is used so that efficiencies are gained. In this example, a correspondence is a tuple of values denoted by the symbol u, which specifies a point on a surface of the sphere mesh. Because the model is a sphere mesh the correspondences are computed using a closed form solution which means that the correspondences are computed in a finite number of operations. Knowledge of the capture device used to capture the sensor data is used in the calculation of the correspondences. Each time operation 404 is carried out the correspondences are computed from scratch. In contrast, the background example of FIG. 3 uses knowledge of the correspondences from the output of operation 310. Because the model is simple it is possible the compute the correspondences using the closed form solution in a manner such that the correspondences are highly accurate.

A defining function S, which has a closed form solution, is stored at the apparatus and is a function which takes as its input a correspondence u and the pose parameters θ. The defining function S computes a 3D position in the world that point u on the model surface corresponds to.

Once the correspondences have been computed the apparatus computes a lifted optimization 306 jointly over the parameter values of the model and the correspondences. In an example the lifted optimization computes a minimization of the following objective function:

$$\min_{\theta, u_1, \ldots u_n} \sum_{i=1}^{n} \psi(\|x_i - S(u_i; \theta)\|) + \psi^{\perp}(\|x_i^{\perp} - \lambda^{\perp} S^{\perp}(u_i; \theta)\|)$$

Which is expressed in words as a minimum over the pose parameters θ and n values of the correspondences u of the sum of a robust kernel ψ(.) applied to the magnitude of the difference between a 3D point cloud point $x_i$ and a corresponding 3D surface point $S(u_i; \theta)$, and a different robust kernel $\psi^{195}$ (.) applied to the magnitude of the difference between a 3D point cloud normal $x_i^{\perp}$ and a corresponding 3D surface normal $S^{\perp}(u_i; \theta)$. The 3D surface point in this equation lies on a sphere mesh, while the 3D surface normal is an approximation to the geometric normal of a smooth surface such as a subdivision surface. The robust kernels ψ(.) and $\psi^{195}$ (.) are a Geman-McClure kernel, a Huber kernel, a Quadratic kernel or other kernel. The symbol $\lambda^{\perp}$ denotes a weight.

Note that the term $S^{\perp}(u_i; \theta)$ is a normal disparity term of the objective function. It has not previously been possible to include a normal disparity term in an objective function for fitting sensor data to a sphere mesh. The normal disparity term measures the difference in orientation between the model and the corresponding sensor data points. Note that it is not essential to include the normal disparity term in the objective function in which case the value of the weight $\lambda^{\perp}$ is zero.

The result of the lifted optimization 406 comprises updates to be added to the parameter values of the model, and updates which in the background example of FIG. 3 are applied to the correspondences. In contrast, the method of FIG. 4 discards 410 the updates to the correspondences without having used them. Thus the updates to the parameter values 408 are carried out by adding the computed updates to the parameter values of the model. The updates to the correspondences are discarded at operation 410.

The apparatus checks whether the process of FIG. 4 is to stop or to continue by returning to operation 402. If convergence has been reached, since the amount of the updates at operation 408 was below a threshold, then the process stops. If a specified number of iterations of the process of FIG. 4 have been carried out then the process stops. When the process stops it outputs 414 the parameter values of the model.

Figure 5:
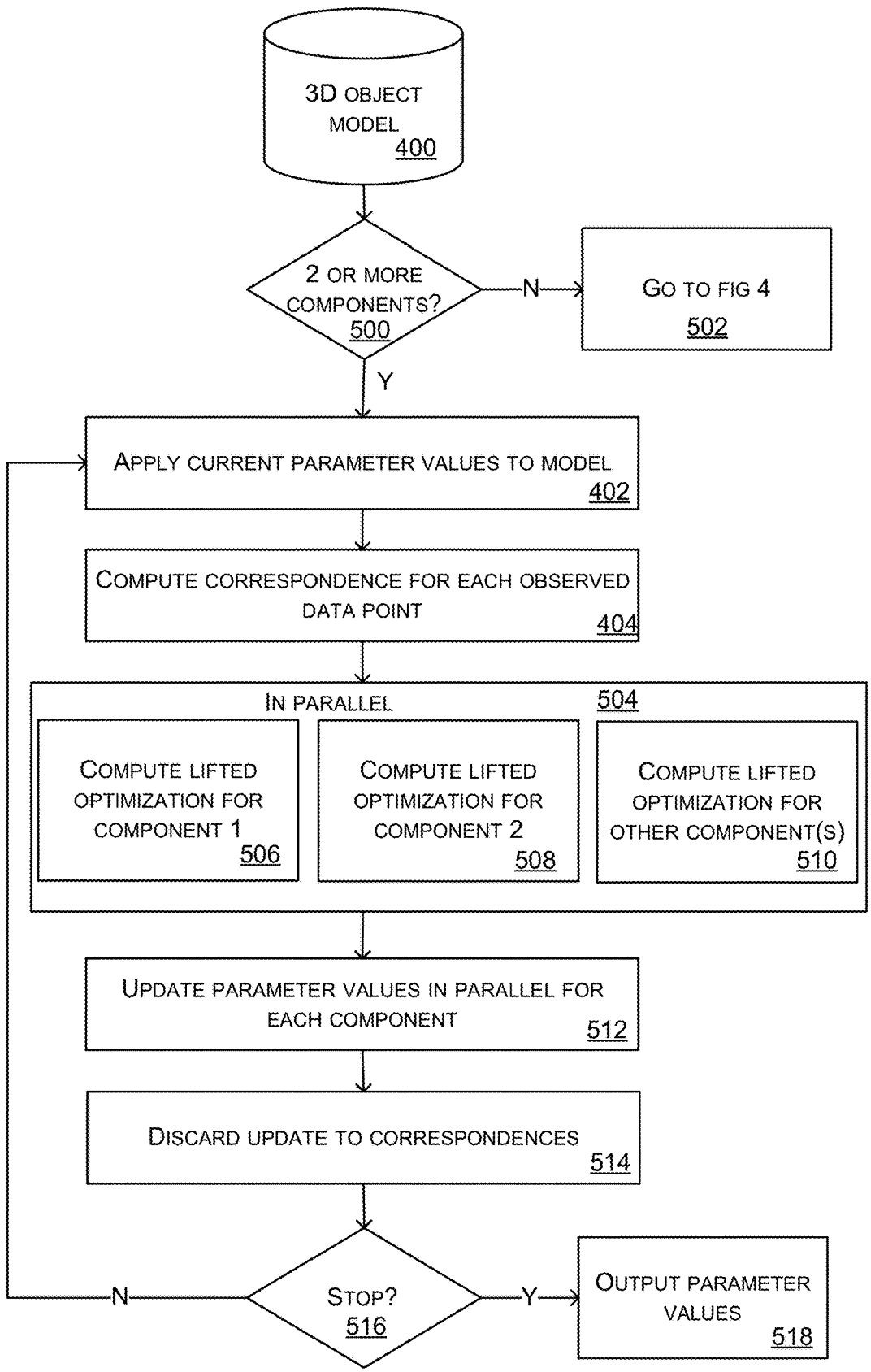
FIG. 5 is a flow diagram of a method of operation at the apparatus of FIG. 1 for use where the 3D object comprises two or more independent components.

In some cases the model comprises a plurality of components which each have their own global position and global orientation. An example is a model of two hands of a person where the two hands together are considered a single object and each individual hand is a component. Another example is a model of two people where each person is a component. Another example is a model of a room containing various furniture items and people and where each person and each item of furniture is a component.

Where the model comprises a plurality of components which each have their own global position and global orientation, the processes of FIGS. 3 and 4 are made more efficient by parallelizing (computing for each component in parallel) the part of the process which occurs after the correspondences have been computed. The operation of computing the correspondences is not solved independently per component since it needs to take into account relationships between the components (such as the two hands of an individual). FIG. 5 is a flow diagram of the method of FIG. 4 which is parallelized in this way.

FIG. 5 is a flow diagram of an example method of operation at the apparatus of FIG. 1. The apparatus accesses a sphere mesh model 500 of the object. For example, in the case that the aim is to track a pair of human hands the apparatus accesses a neutral sphere mesh model of a generic pair of human hands. The apparatus checks 500 if the model has two or more components which each have their own global position and global orientation. If so the process proceeds to operation 402. If not, the process goes 502 to FIG. 4.

The apparatus receives captured data depicting the object to be tracked. For example, the captured data is a 3D point cloud, a depth map, one or more frames of raw time of flight data, color image data or other captured data depicting the object to be tracked. Optionally a region of interest is extracted from the captured data where the region of interest depicts the object to be tracked rather than other parts of the scene or environment in which the object is present. For example, the apparatus uses machine learning technology or image analysis to extract a region of interest of the captured data depicting the object to be tracked. The region of interest may or may not be contiguous.

In some examples, where the region of interest comprises parts of a depth map, the apparatus computes a 3D point cloud by back projecting the region of interest. In some cases a 3D point cloud is already available. In some cases no 3D point cloud is used.

The apparatus applies 402 current values of the model parameters to the model 400. The current values of the model parameters are the values computed for a previous instance of the captured data 110. If there are no previous instances of captured data 110 then the values are initialized to random values or are manually set.

The apparatus computes 404 a correspondence for each of a plurality of the observed data points in the captured data. The correspondences are computed as described above with reference to FIG. 4 and because the model has two or more components, those components are taken into account in the calculation.

Once the correspondences have been computed the process proceeds in parallel 504 by computing a lifted optimization separately for each component of the model. Thus a lifted optimization is computed 506 for a first component of the model, in parallel with computing 508 a lifted optimization for a second component of the model, and in parallel with computing 510 a lifted optimization for any other component of the model. The lifted optimization is as described above for FIG. 4.

The result of the lifted optimization comprises updates to be added to the parameter values of the model, and updates which in the background example of FIG. 3 are applied to the correspondences. The method of FIG. 5 discards 514 the updates to the correspondences without having used them. Thus the updates to the parameter values 512 are carried out in parallel by adding the computed updates to the parameter values of the model, in parallel for each of the components. The updates to the correspondences are discarded at operation 514.

The apparatus checks whether the process of FIG. 5 is to stop or to continue by returning to operation 402. If convergence has been reached, since the amount of the updates at operation 512 was below a threshold, then the process stops. If a specified number of iterations of the process of FIG. 5 have been carried out then the process stops. When the process stops it outputs 518 the parameter values of the model.

Where the process of FIG. 3 is carried out for a model with two or more components, the process is parallelized in the same way as for FIG. 5.

The process of any of FIGS. 3, 4 and 5 is optionally repeated, for example as new captured data arrives as part of a stream of captured data. In some examples the process of any of FIGS. 3, 4 and 5 is arranged to include reinitialization whereby the pose parameters used at operations 302, 402 are obtained from another source such as the second pose estimator 104. For example, using global positioning sensor data, using another pose detector which is independent of the pose detector of FIG. 1, using random values or in other ways. Reinitialization occurs according to various criteria such as at specified time intervals, at specified intervals of instances of captured data, according to user input, according to error metrics which indicate error in the pose values or in other ways. Reinitialization using an independent pose detector is found to give good results.

Figure 6:
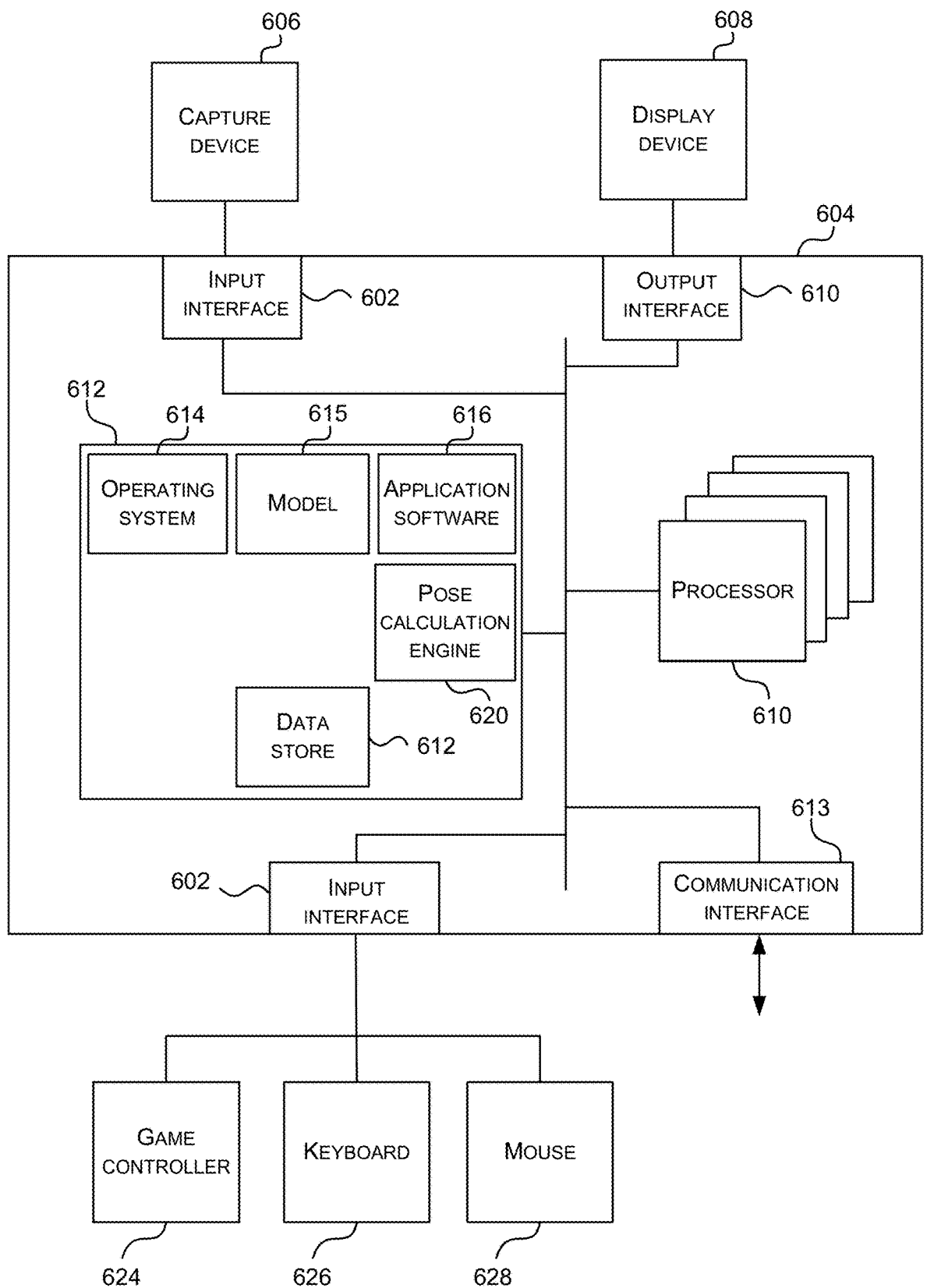
FIG. 6 illustrates an exemplary computing-based device in which embodiments of a pose detector are implemented. Like reference numerals are used to designate like parts in the accompanying drawings.

FIG. 6 illustrates various components of an exemplary computing-based device 604 which may be implemented as any form of a computing and/or electronic device, and in which embodiments of systems for calculating pose of objects from observed data such as one or more images may be implemented.

Computing-based device 604 comprises one or more processors 600 which may be microprocessors, controllers, graphics processing units, parallel processing units, or any other suitable type of processors for processing computing executable instructions to control the operation of the device in order to calculate pose of an object from observed data such as one or more images. In some examples, for example where a system on a chip architecture is used, the processors 600 may include one or more fixed function blocks (also referred to as accelerators) which implement a part of the method of model fitting and pose calculation in hardware (rather than software or firmware).

The computing-based device 604 comprises one or more input interfaces 602 arranged to receive and process input from one or more devices, such as user input devices (e.g. capture device 606, a game controller 624, a keyboard 626 and/or a mouse 628). This user input may be used to control software applications or games executed on the computing device 604.

The computing-based device 604 also comprises an output interface 610 arranged to output display information to a display device 608 which can be separate from or integral to the computing device 604. The display information may provide a graphical user interface. In an example, the display device 608 may also act as the user input device if it is a touch sensitive display device. The output interface may also output data to devices other than the display device, e.g. a locally connected printing device.

The computer executable instructions may be provided using any computer-readable media that is accessible by computing based device 604. Computer-readable media may include, for example, computer storage media 612 such as memory and communications media. Computer storage media 612, such as memory 612, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media 612 (memory) is shown within the computing-based device 604 it will be appreciated that the storage may be distributed or located remotely and accessed via a network or other communication link (e.g. using communication interface 613).

Platform software comprising an operating system 614 or any other suitable platform software may be provided at the computing device 604 to enable application software 616 to be executed on the device. A data store 622 is provided to store data such as parameter values, correspondences, captured sensor data and other data. A pose calculation engine 612 implements the method of any of FIGS. 3, 4 and 5.

Alternatively or in addition to the other examples described herein, examples include any combination of the following clauses:

Clause A. An apparatus for detecting pose of an object, the apparatus comprising:
  a processor configured to receive captured sensor data depicting the object;
  a memory storing a model of a class of object of which the depicted object is a member, the model comprising a plurality of parameters specifying the pose, comprising global position and global orientation, of the model;
  the processor configured to compute values of the parameters of the model by calculating an optimization to fit the model to the captured sensor data, wherein the optimization comprises iterated computation of: updates to the values of the parameters and updates to values of variables representing correspondences between the captured sensor data and the model, the updates being interdependent in computation; and
  wherein the processor is configured to discard the updates to values of the variables representing correspondences without applying the updates.
  By discarding the updates to values of the variables representing correspondences, it does not matter whether the model is a single 2-manifold. That is, it does not matter if the model is a sphere mesh for example. Thus the pose is detected in an efficient manner which is accurate and works for simple models such as sphere meshes. Using a simple model gives benefits for downstream applications which use the computed pose.

Clause B. The apparatus of clause A wherein the model is not a single 2-manifold and is not assumed to be a single 2-manifold. Thus the pose can be computed for a wide variety of model types which gives flexibility and suitability of the method to a variety of different applications.

Clause B1 The apparatus of clause A wherein the processor is configured to compute the optimization both where the model is a manifold surface model and where the model is a non-manifold model. This gives the benefit that the apparatus is workable for a great variety of types of model.

Clause C. The apparatus of clause A or clause B wherein the model is a sphere mesh model. Using a sphere mesh is particularly beneficial since it is a simple model which is easy to store, manipulate and compute correspondences with.

Clause E. The apparatus of any preceding clause wherein the model comprises a plurality of spheres contained in one or more capsules, and where the spheres press against inner walls of the capsules. Using spheres and capsules enables the model to accurately represent a wide variety of real world objects.

Clause F. The apparatus of any preceding clause wherein the processor is configured to compute, using a closed form solution, initial values of the variables representing correspondences for use in the optimization. By enabling a closed form solution to be used, accurate values of the correspondence variables are computed efficiently and accurately.

Clause G. The apparatus of any preceding clause wherein the model is a sphere mesh and wherein the processor is configured to compute initial values of the variables representing correspondences for use in the optimization, by computing closest points on the sphere mesh to points in the captured sensor data, given knowledge of a capture device used to capture the sensor data. This is an efficient and accurate process.

Clause H. The apparatus of any preceding clause wherein the optimization takes into account a normal disparity term, which is a term expressing a difference in orientation between the model and the captured sensor data. It is found that inclusion of a normal disparity term improves accuracy without unduly detrimenting compute time.

Clause I. The apparatus of any preceding clause wherein the model comprises at least two components each having an independent global position and an independent global orientation, and wherein the processor is configured to compute the optimization separately for each component in parallel. Using parallelization in this way enables efficiency gains whilst at the same time retaining accuracy.

Clause J. The apparatus of clause I wherein the processor is configured to compute initial values of the variables representing correspondences by taking into account the at least two components. Accuracy is retained since the correspondences take into account the at least two components.

Clause K. The apparatus of any preceding clause where the processor is configured to use a gradient-based optimization to calculate the optimization. This gives a practical and efficient way of computing the optimization.

Clause L. The apparatus of any preceding clause where the pose parameters comprise one or more joint positions. Including joint positions enables pose of articulated objects to be detected, such as human hands, laptop computers and other articulated objects.

Clause M. The apparatus of any preceding clause where the captured sensor data comprises a depth image and the processor is configured to back project the depth image to compute a three dimensional point cloud.

Clause N. The apparatus of any preceding clause where the processor is arranged to extract at least one region of interest from the captured sensor data, and to use the region of interest and not the rest of the captured sensor data during the optimization. Using region of interest extraction facilitates efficiency.

Clause O. The apparatus of any preceding clause which is arranged to reinitialize the optimization using data from another source. This is found to give significant improvement in performance.

Clause P. A computer-implemented method of detecting pose of an object, the method comprising:
  receiving, at a processor, captured sensor data depicting the object;
  storing, at a memory, a model of a class of object of which the depicted object is a member, the model comprising a plurality of parameters specifying the pose, comprising global position and global orientation, of the model;
computing values of the parameters of the model by:
calculating an optimization to fit the model to the captured sensor data, wherein the optimization comprises iterated computation of updates to: the values of the parameters and updates to values of variables representing correspondences between the captured sensor data and the model, the updates being interdependent in computation; and
discarding updates to values of the variables representing correspondences without applying the updates.

Clause Q. An apparatus for detecting pose of an object, the apparatus comprising:
a processor configured to receive captured sensor data depicting the object;
a memory storing a model of a class of object of which the depicted object is a member, the model comprising a plurality of components, and for each component a plurality of parameters specifying the pose, comprising global position and global orientation, of the model;
the processor configured to compute values of the parameters of the model by calculating an optimization to fit the model to the captured sensor data, where variables representing correspondences between the captured sensor data and the model are included in the optimization jointly with the pose parameters; and wherein the processor is configured to compute the optimization separately for each component in parallel. Using parallelization in this way gives efficiency gains without affecting accuracy.

Clause R. The apparatus of clause Q wherein the processor is configured to compute initial values of the variables representing correspondences by taking into account the at least two components.

Clause S. The apparatus of clause R wherein the processor is configured to discard updates to the variables representing correspondences, the updates having been computed by the optimization.

Clause T. The apparatus of clause S wherein the processor is configured to repeat the calculation of the optimization using values of the variables representing correspondences.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An apparatus for detecting pose of an object, the apparatus comprising:
a processor configured to receive captured sensor data depicting the object;
a memory storing a model of a class of object of which the depicted object is a member, the model comprising a plurality of parameters specifying the pose, comprising global position and global orientation, of the model;

the processor configured to compute values of the parameters of the model by calculating an optimization to fit the model to the captured sensor data, wherein the optimization comprises iterated computation of: updates to the values of the parameters and updates to values of variables representing correspondences between the captured sensor data and the model, the updates being interdependent in computation; and wherein the processor is configured to discard the updates, before the updates are used, to the values of the variables representing correspondences.

2. The apparatus of claim 1 wherein the model is not a single 2-manifold and is not assumed to be a single 2-manifold.

3. The apparatus of claim 1 wherein the processor is configured to compute the optimization both where the model is a manifold surface model and where the model is a non-manifold model.

4. The apparatus of claim 1 wherein the model is a sphere mesh model.

5. The apparatus of claim 1 wherein the model comprises a plurality of spheres contained in one or more capsules, and where the plurality of spheres press against inner walls of the capsules.

6. The apparatus of claim 1 wherein the processor is configured to compute, using a closed form solution, initial values of the variables representing correspondences for use in the optimization.

7. The apparatus of claim 1 wherein the model is a sphere mesh and wherein the processor is configured to compute initial values of the variables representing correspondences for use in the optimization, by computing closest points on the sphere mesh to points in the captured sensor data, given knowledge of a capture device used to capture the sensor data.

8. The apparatus of claim 1 wherein the optimization takes into account a normal disparity term, which is a term expressing a difference in orientation between the model and the captured sensor data.

9. The apparatus of claim 1 wherein the model comprises at least two components each having an independent global position and an independent global orientation, and wherein the processor is configured to compute the optimization separately for each component in parallel.

10. The apparatus of claim 9 wherein the processor is configured to compute initial values of the variables representing correspondences by taking into account the at least two components.

11. The apparatus of claim 1 where the processor is configured to use a gradient-based optimization to calculate the optimization.

12. The apparatus of claim 1 where the parameters comprise one or more joint positions.

13. The apparatus of claim 1 where the captured sensor data comprises a depth image and the processor is configured to back project the depth image to compute a three dimensional point cloud.

14. The apparatus of claim 1 where the processor is configured to extract at least one region of interest from the captured sensor data, and to use the region of interest and not any other of the captured sensor data during the optimization.

15. The apparatus of claim 1 wherein the processor is configured to reinitialize the optimization using data from another source.

16. A computer-implemented method of detecting pose of an object, the method comprising:

receiving, at a processor, captured sensor data depicting the object;

storing, at a memory, a model of a class of object of which the depicted object is a member, the model comprising a plurality of parameters specifying a pose, comprising global position and global orientation, of the model; and computing values of the parameters of the model by:
calculating an optimization to fit the model to the captured sensor data, wherein the optimization comprises iterated computation of: updates to the values of the parameters and updates to values of variables representing correspondences between the captured sensor data and the model, the updates being interdependent in computation; and discarding the updates, before the updates are used, to the values of the variables representing correspondences.

17. The method of claim 16 comprising using the computed values of the parameters to enable an apparatus to interact with the depicted object or using the computed values of the parameters to enable the depicted object to interact with a computing device.

18. An apparatus for detecting pose of an object, the apparatus comprising:

a processor configured to receive captured sensor data depicting the object;

a memory storing a model of a class of object of which the depicted object is a member, the model comprising a plurality of components, and for each component a plurality of parameters specifying the pose, comprising global position and global orientation, of the model;

the processor configured to:
compute values of the parameters of the model by calculating an optimization to fit the model to the captured sensor data, where variables representing correspondences between the captured sensor data and the model are included in the optimization jointly with the parameters;

compute the optimization separately for each component in parallel; and discard updates, before the updates are used, to the variables representing correspondences.

19. The apparatus of claim 18 wherein the processor is configured to compute initial values of the variables representing correspondences by taking into account at least two components of the plurality of components.

20. The apparatus of claim 18 wherein the updates are computed by the optimization.

* * * * *